June 30, 1970  J. BELART  3,517,783
FLOATING-YOKE DISK BRAKE WITH WEAR-COMPENSATING MECHANISM
Filed Jan. 25, 1968
FIG.1
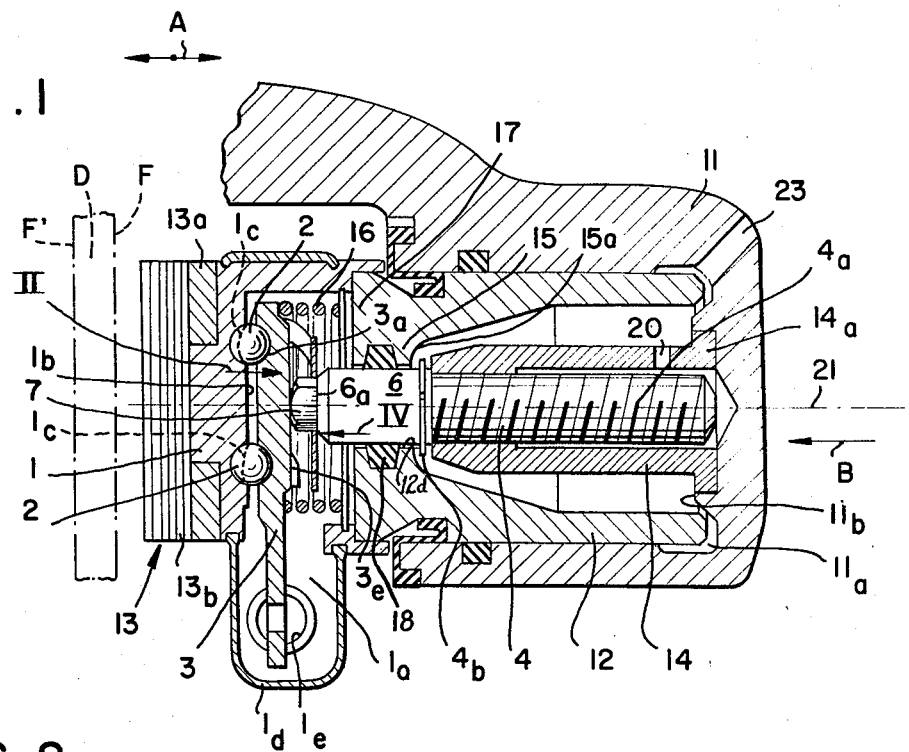
FIG.2
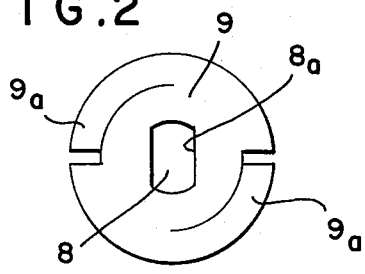
FIG.4
FIG.3
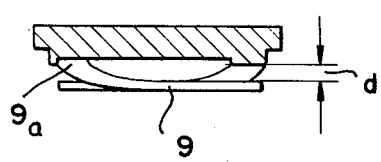
FIG.5
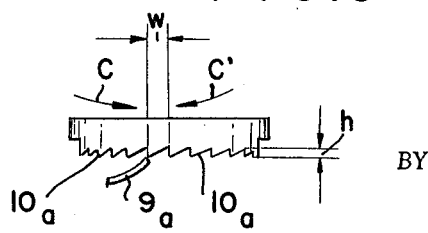
JUAN BELART
INVENTOR.
BY
Karl J. Ross
Attorney United States Patent Office 3,517,783
Patented June 30, 1970

3,517,783
FLOATING-YOKE DISK BRAKE WITH WEAR-COMPENSATING MECHANISM
Juan Belart, Walldorf, Germany, assignor to Alfred Teves G.m.b.H., Frankfurt am Main, Germany, a corporation of Germany
Filed Jan. 25, 1968, Ser. No. 700,584
Claims priority, application Germany, Jan. 27, 1967, T 33,090
Int. Cl. F16d *55/16, 65/66*
U.S. Cl. 188—196
10 Claims

ABSTRACT OF THE DISCLOSURE

A self-adjusting mechanism for a disk-type brake in which a spindle passes axially through the wheel-brake cylinder and its piston while being threaded into this cylinder and bearing upon the disk portion of a handbrake lever interposed between the spindle and the brakeshoe and acting upon the latter by cam balls, the spindle and the lever having interengaging pawl-and-ratchet elements for stepping the spindle upon wear of the brake lining with operation of the handbrake lever.

My present invention relates to a floating-yoke disk brake having a wear-compensating mechanism for resetting the brake play upon wear of a brakeshoe.

Disk-type brakes have become increasingly popular in recent years because of their smaller fluid-displacement requirements, increased response to brake actuation, and greater ability to halt the vehicle in relatively short distances. A disk-type brake generally comprises a brake disk coupled with the vehicle wheel and having a pair of annular braking faces lying in planes transverse to the axis of rotation of the wheel; along the periphery of the disk and affixed to a nonrotatable portion of the vehicle is a yoke structure provided with one or more hydraulic wheel-brake cylinders whose axes are perpendicular to the annular braking faces of the disk and may be parallel to the axis of rotation thereof. In the or each wheel-brake cylinder, a piston is provided to urge a respective brakeshoe against the corresponding braking face of the disk. The brakeshoes, which generally extend over only a sector of the disk, having backing plates engageable by the piston and carrying the brake linings which confront and frictionally engage the disk. Disk-type brakes of this character are classified in two categories. In the first, the yoke which extends around the disk and has lobes flanking same, is fixed to the nonrotatable portion of the vehicle, e.g. an axle housing, and is provided in each lobe with a respective cylinder urging the corresponding brakeshoe against the disk. In some cases, the disk may be deflectable or axially shiftable to ensure uniform and balanced pressures from both brakeshoe. In the other category are so-called "floating-yoke" brakes and other brake arrangements in which the yoke is shiftable toward and away from the disk while being prevented from rotating by suitable mounting means. A system of this type requires only a single wheel-brake piston (although a second may be provided), since the yoke in part forms force-transmitting means applying reaction force to a remote brakeshoe. Thus, if one lobe of a floating-yoke brake is formed with the wheel-brake cylinder, whose piston applies the proximal brakeshoe directly to the disk, the hydraulic-reaction force acting upon the yoke will shift the other lobe of the yoke in the direction of the opposite face of the disk and draw the remote brakeshoe thereagainst. Disk brakes also may be provided with mechanically operable brake means, advantageously actuatable via a lever or the like in the region of the driver's seat, to serve as an emergency, a locking or a parking brake. Finally, wheel brakes of the disk type can be considered to have an inner lobe and an outer lobe with respect to the outline of the vehicle. Thus, the inner lobe of the yoke or caliper, which generally has a flange for attachment to the nonrotatable portion of the vehicle or which is mounted upon the axle flange thereof, lies along the inner surface of the disk while the other flange, cantilevered from the "flange lobe" or the "flange half" of the yoke is disposed along the side of the disk at which the tire-carrying wheel is mounted and is termed the "wheel half" or "outer half" of the brake housing.

It is the principal object of the present invention to provide an improved floating-yoke disk-brake assembly of simplified construction.

A more specific object of this invention is to provide a floating-yoke disk brake with highly effective automatically operable adjusting means for compensating for wear of the brake lining.

According to the present invention, the outer lobe of a shiftable-yoke brake housing for a disk brake, which is provided with a wheel-brake cylinder and a hollow or tubular piston shiftable therein, is formed with an internal screwthread coaxially with the piston and preferably formed in a sleeve mounted at the floor of a cylinder remote from the proximal brakeshoe, and a bolt or spindle threaded into this bore, whose end close to the proximal piston co-operates with pawl-and-ratchet means operable by the mechanically controlled (handbrake) lever which bears upon the brakeshoe independently of the wheel-brake piston, the latter being axially shiftable relatively to the threaded spindle. The ratchet means of the present invention comprises a pawl member rotatable about the axis of the spindle and rotatably entraining same and an annular ratchet formation on a disk portion of the lever, the teeth of this ratchet having an angular spacing or pitch which is larger than the normal angular displacement of the lever necessary to bring the brake into play for normal operation, absent wear of the lining. This construction permits the ratchet to operate through a distance of one tooth whenever the handbrake is actuated. Consequently, the ratchet is not stepped in the absence of brake wear and the self-adjusting mechanism remains unaffected by handbrake operation. With time, of course, the brake lining suffers wear and the angular displacement necessary to shift the brakeshoe through the increased play continuously increases until the ratchet finally is swung through a distance greater than the width of a single tooth whereupon the pawl is stepped to rotate the spindle and re-establish the brake play upon reverse or forward rotation of the handbrake lever.

According to a more specific feature of this invention, the spacing of the teeth of the ratchet and the pitch of the spindle thread are so selected that the brakeshoe is advanced axially by the spindle when the ratchet steps the latter through a distance of one tooth to an extent corresponding precisely to the wear of the brakeshoe which permitted the pawl to jump to the next tooth. Moreover, the hollow piston may be provided at its end proximal to the brakeshoe with a cylindrical opening slidably receiving a cylindrical shank of the spindle; seal means is provided between the spindle and the piston to permit axial movement of the latter without escape of fluid from the cylinder. This arrangement has the advantage that it provides an additional guide for the spindle and also serves to guide the piston in its axial movement. The rotatable lever of the manual operating means is provided with cam means between the backing plate of the brakeshoe and the disk portion of the lever, preferably in the form of a plurality of roller elements which are received in camming ramps of the backing plate and/or the disk portion of the lever. To ensure proper operation of the automatic adjusting means, the ramps are designed to cam the brakeshoe in the sense in which the threads of the spindle are oriented for advance of brakeshoe or spindle.

The above and other objects, features and advantages of the present invention will become more readily apparent from the following description in which:

FIG. 1 is a fragmentary axial cross-sectional view of a portion of a floating-yoke disk brake embodying the present invention;

FIG. 2 is an elevational view of the pawl member viewed in the direction of arrow II in FIG. 1;

FIG. 3 is a cross-sectional view through the ratchet-and pawl assembly:

FIG. 4 is an elevational view of the actuating lever of this system taken in the direction of arrow IV in FIG. 1; and FIG. 5 is a side-elevational view in somewhat diagrammatic form of the ratchet-and-pawl elements.

Prior to discussing the embodiment illustrated, it should be noted that the brake shown in FIGS. 1–5 in diagrammatic form may have its manually operable lever and hydraulic system controlled as described in the commonly assigned copending application Ser. No. 585,877 of Dec. 12, 1967 (now U.S. Pat. No. 3,392,806) while the pawl-incline arrangement described hereinafter may be of the type discussed and illustrated in "Principles of Automotive Vehicles," U.S. Government Printing Office Washington, D.C., 1956, pages 427 ff.

The brake shown partially in FIGS. 1–5 is a floating-yoke brake shoe flange side or half has not been illustrated but is mounted in accordance with the usual practice so as to permit movement of the yoke 11 in the direction of arrow A, i.e. transversely to the disk D shown in dot-dash lines in FIG. 1. The wheel side or lobe of the disk is provided with a wheel-brake cylinder 11a in which a hollow piston 12 is axially shiftable (arrow B). At its left-hand end, the piston 12 is formed with a housing structure 1 which bears directly upon the brakeshoe 13, having a backing plate 13a and a lining 13b. The lining 13b is juxtaposed with a braking face F of the disk D. The force-transmitting housing 1 defines, with the forward end 15 of the piston 12, a chamber 1a and has an inner surface 1b formed with ramps 1c for three or more camming balls 2 in the manner described in "Principles of Automotive Vehicles" and the aforementioned copending application. At least three angularly equispaced balls are disposed about the axis 21.

Within the hollow piston 12, which is open toward the base 11a of the cylinder, I provide an axially extending sleeve 14 whose head 14a is recessed in and bears directly on the wall 11b of the yoke 11. Within the housing 1a of the piston, I also provide (see especially FIGS. 1 and 4) a lever 3 which is swingable about the axis 21 of the cylinder and receives the balls 2 at angular equispaced sockets 3a in its disk portion 3b. From the disk portion of this lever, and arm 3c extends radially and has an aperture 3d in which the core wire of a bowden line can be affixed. The bowden line thus may connect the lever 3 with the control lever of the handbrake in the region of the driver's seat of the vehicle. Along its face 3e toward and away from the disk D, the lever 3 forms a seat for a coil spring 16 which retains the lever against the balls 2 and the brakeshoe, this spring being anchored to the lever and to a seating ring 17 so as to apply a restoring torque to the lever upon its angular displacement during handbrake actuation. At a central location within this face 3e of the disk portion, the lever 3 is engaged by the prismatic (non-circular) head 7 of a spindle 4 passing axially through the end 15 of piston 12 and threaded into the sleeve 14. Beyond the threaded portion 4a of the spindle 4, a split ring 4b is engageable with the rear face 15a of the end of piston 12 to form a lost-motion connection therewith and advance the piston 12 to compensate for brake-lining wear as may be required. To allow at least limited axial movement of the piston 12 and the spindle 4, the spindle is provided ahead of the ring 4b with a cylindrical smooth piston 6 hugged by a sealing ring 18 lining the interior of an axial bore 12d of the piston 12. During normal handbrake operation, angular displacement of the lever 3 about the axis 21 with the face 3e abutting the spindle 4, causes the balls 2 to ride up the ramps 1c and axially drive the piston bottom 1 and the brakeshoe 13 against the disk D (arrow B). Since the yoke is axially shiftable as well (arrow A), the brakeshoe along the other side of the disk is drawn into engagement with the surface F' thereof.

According to the principles of the present invention, the sleeve 14 is provided only at its free end with internal threads 5 which correspond to the thread along the spindle portion 4a of the bolt 4. Brake fluid is admitted to the threaded portion through a radial bore 20 in the sleeve 14. As indicated earlier, the head 7 of the bolt 4 is provided with a pair of parallel flats which complementarily receive the flattened portion 8a of a hole 8 formed centrally in a circular spring-disk pawl 9. The latter is provided, at diametrically opposite locations, with a pair of arc-segmental cuts defining outwardly projecting tongues 9a which constitute pawl elements engageable with the teeth of the ratchet (see FIGS. 2, 3 and 5). The ratchet element is here constituted by an annular set of teeth 10 projecting in the direction of the disk 9 carried by the head 7 against the cylinder 6a of the bolt 4. The tongues 9a of pawl 9 are designed to be stepped by the ratchet 10 upon its movement in the direction of arrow C (FIG. 5) while the axial deflection of these tongues ($d$) should be greater than the height $h$ of the teeth 10a of the array 10. The angular width of the tooth $w$ is so selected relative to the angular displacement of the lever 3 that, upon swinging movement of this lever in the brake-applying direction, the pawl tongues 9a slide upwardly along a respective tooth (e.g. tooth 10a'). Assuming that there has been no wear of the brake lining, the pawl tongues 9a and the lever 3 move relatively only through the distance $w$ corresponding to the tooth width for brake application and release. When there has been some lining wear, however, the pawl 9 and the lever 3 are so offset angularly during the subsequent handbrake application that the tongues 9a jump one or more teeth and, upon release of the lever 3 and its return in the opposite direction C', the steep flank of the tooth engaged by each tongue 9a entrains the pawl 9 and the spindle 4 to threadedly advance the latter. Thus, while the ramp of the balls 2 and the thread 4a are oriented with identical sense, the pitch of the thread must be less than the pitch of the ramp to permit the advance of the brakeshoe without self-adjustment prior to operation of the adjusting mechanism. The brake play and degree of advance of the bolt 4 to reset the rest position of the brakeshoe is determined by the angular width $w$ of the teeth of the ratchet 10 and the pitch of the thread of bolt 4 in the manner previously described.

For hydraulic operation of the brake, cylinder 11a is supplied with brake fluid from the master cylinder of the vehicle brake system via a port 23, the bore 20 ensuring pressure equalization within the sleeve 14 upon operation of the self-adjusting means. A seal 22 in the inner wall of the cylinder slidable engages the piston 12 in the usual manner. A dust cover 1d encloses chamber 1a but is provided with an opening 1e through which the bowden line can extend. Upon hydraulic actuation of the brake, piston 12 urges the force-transmitting structure 1 in the direction of arrow B and applies the brakeshoe 13 to the disk. Hydraulic reaction force upon the wall 11b of the cylinder shifts the housing 11 to the right (FIG. 1) to apply the other brakeshoe to face F' of the disk.

In practice, it has been found that the device illustrated in FIGS. 1–5 has the important advantage that the adjusting mechanism remains inactive in the absence of brake wear and comes into play only when the brake-lining wear has attained a predetermined level. Then also, it is ineffective until handbrake operation is undertaken. Preferably, the angular width $w$ of the ratchet teeth 10 is about 15–20° per tooth. Furthermore, it will be apparent from the aforedescribed structure that, although the illustrated embodiment accomplishes the automatic adjustment for brake-lining wear only upon the return stroke, it is also possible to make use of a kinematic reversal, by merely reversing the direction of the teeth and ball tongues, in which the ball 9 begins at the peak of the tooth and during actuation of the handbrake slides downwardly therealong until it engages the steep flank to drive the spindle 4 and accomplish adjustment during the brake-applying stroke. While adjustment upon actuation of the handbrake requires that the inclination of the ramps and the thread of the bolt be in the same sense, adjustment upon release of the handbrake requires that the ramp and thread inclination be opposite one another. And it will also be understood that the adjusting means is equally effective when used in the flange side of the yoke.

I claim:
1. A disk-type brake comprising:
an axially fixed rotatable brake disk;
a brake housing disposed along the periphery of said disk and forming a brake cylinder open in the direction thereof, said housing being shiftable axially of said disk to apply a brake pad thereto;
a piston axially shiftable in said cylinder;
a brakeshoe displaceable by said piston in the direction of said disk and interposed between said piston and said disk;
a mechanically operable brake lever swingable about the axis of said cylinder and provided with cam means for displacing said brakeshoe against said disk upon swinging movement of said lever relatively to said housing; and
automatically operable adjusting means for compensating wear of the brakeshoe, said adjusting means including
a spindle extending along said axis in said cylinder and threadedly received in said housing while passing axially through said piston and forming a stop for said brakeshoe, and
a pawl-and-ratchet assembly including cooperating pawl and ratchet elements between said spindle and said lever, one of said elements being formed on said lever and the other of said elements being mounted on said spindle for stepping the latter upon rotation of said lever, said ratchet element having an annular array of angularly offset teeth with an angular spacing smaller than the angular displacement of said lever required to apply said brakeshoe against said disk in the absence of brakeshoe wear.

2. The brake defined in claim 1 wherein said pawl element is mounted on said spindle and said ratchet element is formed on said lever, said teeth being dimensioned such that said pawl element is stepped by said ratchet element through a distance of one tooth only upon the wear of said brakeshoe to a predetermined extent.

3. In a disk-type brake having a brake housing forming a brake cylinder open in the direction of a rotatable brake disk, a piston axially shiftable in said cylinder, a brakeshoe displaceable by said piston in the direction of said disk and interposed between said piston and said disk, and a mechanically operable brake lever swingable about the axis of said cylinder and provided with cam means for displacinng said brakeshoe against said disk upon swinging movement of said lever relatively to said housing, the improvement which comprises automatically operable adjusting means for compensating wear of the brakeshoe, said adjusting means including a spindle extending along said axis and threadedly received in said cylinder while passing axially through said piston and forming a stop for said brakeshoe, and a pawl-and-ratchet assembly including co-operating pawl and ratchet elements respectively mounted on said spindle and formed on said lever for stepping the latter upon rotation of said lever, said ratchet element having an annular array of angularly offset teeth with an angular spacing smaller than the angular displacement of said lever required to applying said brakeshoe against said disk in the absence of brakeshoe wear, said teeth being dimensioned such that said pawl element is stepped by said ratchet element through a distance of one tooth only upon the wear of said brakeshoe to a predetermined extent, said cylinder being provided with a sleeve extending axially in the direction of said brakeshoe and threadedly receiving said spindle.

4. The improvement defined in claim 3 wherein said lever has a return stroke after advance of said brakeshoe, said pawl element being stepped by said ratchet element upon the return stroke of said lever.

5. The improvement defined in claim 3 wherein said lever has a forward stroke in which said brakeshoe is applied to said disk, said ratchet element engaging said pawl element to rotate said spindle upon movement of said lever in said forward direction.

6. The improvement defined in claim 3 wherein said sleeve is formed with a bore communicating between the interior of said cylinder and the interior of the sleeve.

7. The improvement defined in claim 3 wherein said piston is formed with a bottom having a bore through which said spindle extends, said piston being formed with seal means slidably engaging said spindle.

8. The improvement defined in claim 3 wherein said cam means includes a force-transmitting member between said piston and said brakeshoe forming a chamber receiving said lever said cam means comprising at least three angularly spaced camming balls disposed between said lever and a wall of said chamber, and spring means in said chamber urging said lever and said balls against said wall.

9. The improvement defined in claim 3 wherein said teeth have a angular spacing of between 15° and 20°.

10. The improvement defined in claim 3 wherein said ratchet element is an annular array of teeth formed on said lever, said spindle being engageable with said lever centrally of said array.

References Cited

UNITED STATES PATENTS 3,211,263  10/1965  Harrison _____ 188—72

DUANE A. REGER, Primary Examiner

U.S. Cl. X.R.

188—73, 106